Feb. 27, 1923.

C. G. SMITH 1,446,727

REFRIGERATING APPARATUS

Filed Jan. 25, 1919

Patented Feb. 27, 1923.

1,446,727

UNITED STATES PATENT OFFICE.

CHARLES G. SMITH, OF CAMBRIDGE, MASSACHUSETTS, ASSIGNOR, BY MESNE ASSIGNMENTS, OF ONE-HALF TO LAURENCE K. MARSHALL, OF SOMERVILLE, MASSACHUSETTS.

REFRIGERATING APPARATUS.

Application filed January 25, 1919. Serial No. 273,152.

*To all whom it may concern:*

Be it known that I, CHARLES G. SMITH, a citizen of the United States, residing at Cambridge, in the county of Middlesex and State of Massachusetts, have invented certain new and useful Improvements in Refrigerating Apparatus; and I do hereby declare the following to be a full, clear, and exact description of the invention, such as will enable other skilled in the art to which it appertains to make and use the same.

The present invention relates to refrigerating apparatus.

The object of the invention is to provide an apparatus of this character more particularly adapted for the cooling of small receptacles which is extremely compact and operates without attention over long periods and with a minimum expenditure of power.

With this object in view one feature of the invention contemplates the provision of a sealed container from which substantially all of the air has been expelled, having a pocket which extends downwardly into the receptacle to be cooled and is partially filled with liquid, together with means for rotating the container to cause condensation of the vapor against the walls of the container due to centrifugal force.

In the simplest and most efficient form of the invention which has yet been devised, the container comprises an elongated and substantially tubular portion extending downwardly into the receptacle to be cooled and surmounted outside of the receptacle to be cooled by a portion of substantially greater diameter adapted to retain the condensate during the rotation of the sealed container.

Still further features of the invention consist in certain novel features of construction, combinations and arrangements of parts hereinafter described and claimed, the advantages of which will be obvious to those skilled in the art from the following description.

Figure 1:
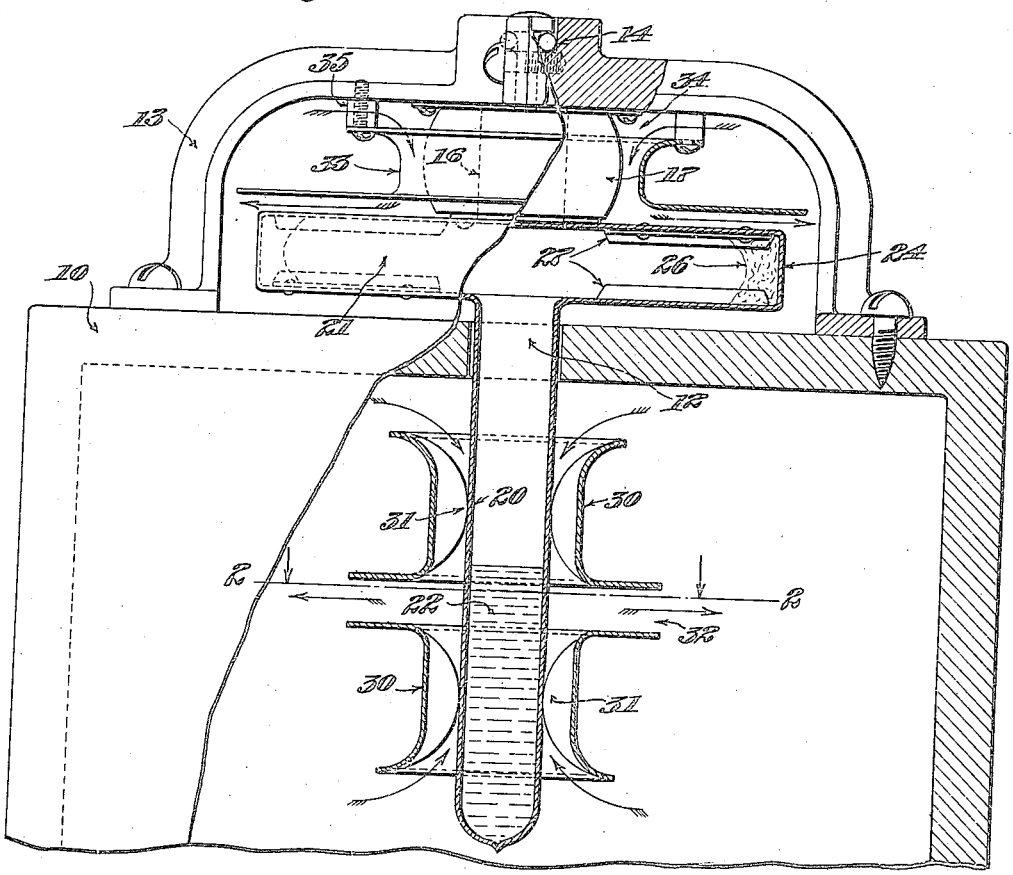
Figure 2:
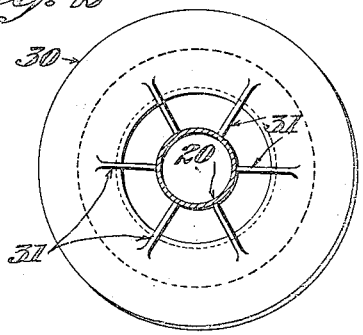

In the accompanying drawing illustrating the invention, Figure 1 represents a longitudinal section in elevation of the new refrigerating apparatus shown embodied in a receptacle to be cooled; and Fig. 2 is a detail showing a section upon the line 2—2 of Figure 1.

As indicated in the illustrated embodiment of the invention the apparatus is supported upon the top of a refrigerating box 10 and comprises simply a rotating sealed container 12 journaled in an overhead bearing 14 which is mounted in a curved arm 13 secured to the top of the receptacle, as shown. The container is rotated at the desired rate of speed by a motor having its armature indicated at 16 mounted directly upon the shaft of the container and having a stationary field indicated at 17. The container comprises generally a depending tubular portion 20 extending outwardly into the receptacle 10 and surmounted at its upper end by a disk-shaped portion 21. This container may be drawn from steel alloy, aluminum or other suitable material. The portion 20 is partially filled, as indicated in the drawing, with the liquid indicated at 22 and the remaining space within the container is filled with vapor under a pressure less than atmospheric, the air having been completely expelled from the container after the insertion of the liquid and the container then hermetically sealed. Upon rotating the container at the necessary rate of speed the vapor contained in the tubular portion 20 and the disk-like portion 21 of the container is compressed against the outer rim 24 causing it to condense and give off heat. The condensation of the vapor at the rim 24 creates an additional vacuum in the upper portion of the tube 20 and the central regions of the portion 21 causing further vaporization of the liquid 22 which, in turn, is condensed, giving off heat. Thus it will be seen that during the rotation of the container heat is constantly being extracted from the interior of the receptacle 10 due to the vaporization of the liquid 22 and is given off to the air surrounding the portion 21 due to the condensation of the vapor at the rim 24. After the rotation of the container is continued for some time a wall of liquid, as indicated at 26, is built up inside the rim 24 and is retained as shown by the centrifugal force due to the rapid rotation of the container. A series of radial ribs 27, formed upon the inside faces of the piston 21, serve to cause a spinning motion of the liquid vapor.

It is proposed to employ carbon tetrachloride as the cooling liquid since this fluid has a comparatively large molecular weight and the heavy vapor given off is easily acted upon and condensed by the centrifugal force. It will be obvious, however, that there are a number of other liquids suitable for the purpose in hand and the present invention contemplates the employment of any liquid having the necessary properties.

If the rotation of the container were continued for a sufficient length of time it would finally result in extracting all of the liquid from the tubular portion 20 and depositing this in a thick film about the rim 24, when the cooling action would discontinue. In order to permit the recurrence of the cycle of operations, therefore, the rotation of the container is periodically stopped, causing the condensed liquid indicated at 26 to flow back into the bottom of the tube 20, after which the rotation of the container is again started. This periodical starting and stopping of the container may be conveniently accomplished by one of several well-known mechanisms for stopping the motor after a predetermined number of revolutions and again starting the motor at the expiration of a definite time.

In order that the extraction of heat from the interior of the receptacle may be facilitated, the tubular portion 20 of the container is surrounded by a pair of sleeves 30 each having a series of radial fins 31, and an annular flange 32 spaced apart as shown to form an outlet duct. These sleeves are designed in such a manner that the rotation of the container causes air to be drawn in at the opposite open ends of the sleeves and expelled through the annular duct 32. In order to aid in the dissipation of heat from the portion 21 of the container, a similar construction is provided and consists of a disk 33 spaced away from the upper face of the container and having an axial intake opening 34 through which the air is drawn during the rotation of the container. The disk is secured to the arm 13 through a plurality of lugs 35. The above described construction forms a simple means for increasing the circulation of air about the heat conducting surfaces of the container.

This type of construction operating in the manner set forth is the most efficient form of mechanism known for first vaporizing and then condensing the cooling liquid and as an extremely small amount of power is necessary to operate the direct connected motor it may readily be seen that the apparatus as a whole operates with great efficiency. Of course it should be understood that if so desired the motor, instead of being directly connected to the shaft of the container, may rotate at a slower speed and rotate the container through some suitable form of driving connection.

While it is preferred to employ the specific construction and arrangement of parts shown and described, it will be understood that this construction and arrangement is not essential except so far as specified in the claims, and may be changed or modified without departing from the broader features of the invention.

The invention having been described, what is claimed is:

1. A refrigerating apparatus comprising a sealed container from which substantially all of the air has been exhausted, having a substantially tubular portion extending downwardly into the receptacle to be cooled and surmounted outside of the receptacle to be cooled by a portion of substantially greater diameter, the tubular portion being partially filled with liquid and the remaining portions with vapor, and means for rotating the container about a vertical axis to cause the condensation of the vapor against the rim of the upper portion of the container.

2. A refrigerating apparatus comprising a sealed container having a lower portion extending into the receptacle to be cooled and an upper portion located without the receptacle to be cooled, the lower portion being partially filled with liquid and the upper portion being filled with vapor, and means for rotating the container to cause vaporization of the liquid in the lower portion and condensation of the vapor in the upper portion.

3. A refrigerating apparatus comprising a sealed container partially filled with liquid in the lower portion, and having vapor in the upper portion, a series of ribs formed upon the inner face of the upper portion, and means for rotating the container to cause a spinning motion of the vapor through the medium of the ribs.

4. A refrigerating apparatus comprising a sealed container having an inner portion extending within the receptacle to be cooled and an outer portion positioned without the receptacle to be cooled, the inner portion being partially filled with liquid and the outer portion being filled with vapor, means for rotating the container, and means for causing an artificial circulation of air past the inner and outer portions of the container.

5. A refrigerating apparatus comprising a sealed container having inner and outer portions, the inner portion being partially filled with liquid and the outer portion being filled with vapor, a sleeve surrounding the inner portion and adapted to direct air past this portion of the container, a pair of disks enclosing the outer portion and adapted in a like manner to direct air past this portion of the container, and means for rotating the container.

CHARLES G. SMITH.